United States Patent [19]
Bodin et al.

[11] Patent Number: 5,259,264
[45] Date of Patent: Nov. 9, 1993

[54] ADJUSTABLE STEERING WHEEL

[75] Inventors: Jan-Olof Bodin, Alingsas; Sven-Ake Hurtig, Gotenburg, both of Sweden

[73] Assignee: AB Volvo, Göteborg, Sweden

[21] Appl. No.: 854,659

[22] PCT Filed: Oct. 31, 1990

[86] PCT No.: PCT/SE90/00706
§ 371 Date: Apr. 30, 1992
§ 102(e) Date: Apr. 30, 1992

[87] PCT Pub. No.: WO91/06461
PCT Pub. Date: May 16, 1991

[30] Foreign Application Priority Data
Oct. 31, 1989 [SE] Sweden .................. 8903643

[51] Int. Cl.$^5$ .................................. B62D 1/18
[52] U.S. Cl. ............................ 74/493; 74/531; 188/166; 280/775; 403/61; 403/85; 403/146
[58] Field of Search ............... 74/493, 531; 188/166; 280/775; 403/61, 85, 146

[56] References Cited

U.S. PATENT DOCUMENTS

| | | | |
|---|---|---|---|
| 4,018,104 | 4/1977 | Bland et al. | 403/146 X |
| 4,449,419 | 5/1984 | Bruguera | 74/493 |
| 4,656,888 | 4/1987 | Schmitz | 74/493 |

FOREIGN PATENT DOCUMENTS 3510311 9/1986 Fed. Rep. of Germany.
2092967 8/1982 United Kingdom.

Primary Examiner—Allan D. Herrmann
Attorney, Agent, or Firm—Burns, Doane, Swecker & Mathis

[57] ABSTRACT

An adjustable steering wheel, preferably for trucks, includes a steering column (4) on an upper supporting arm (3), which is pivoted in a lower supporting arm (2), which in turn is pivotally mounted to a windshield beam, for example, in the cab. A locking device in the form of a first and a second friction plate package (19, 11) with an intermediate conical spring washer package (30) locks the supporting arms relative to each other and relative to the cab. By means of a pair of levers (32, 33), a control cable (36) and a foot pedal, the spring package can be compressed to remove the locking effect of the plate packages.

8 Claims, 3 Drawing Sheets

ADJUSTABLE STEERING WHEEL

BACKGROUND OF THE INVENTION

The present invention relates to a steering wheel arrangement for motor vehicles, comprising a steering wheel, a steering shaft joined to the steering wheel, a bearing device in which the steering shaft is rotatably mounted, means for moveably suspending the bearing device in the vehicle and locking means, by means of which the bearing device is lockable in various positions relative to the suspension means, wherein the bearing device is joined to the suspension means for pivot movement about a first shaft, and that the lock means comprise, firstly, a first package of thin friction plates alternatingly joined to the bearing device and the suspension means, secondly, spring clamping means arranged to press together, with constant spring force, the thin plates in the plate package to lock the bearing device and, thirdly, manually actuated means to remove the clamping effect of the clamping means and release the bearing device for resetting relative to the suspension means.

Known arrangements of this type make it possible to adjust the vertical position of the steering wheel to adapt it to the driving position of the driver, either through a telescoping arrangement or through an arrangement with articulating means with a horizontal pivot shaft. In the latter case, the vertical adjustment also involves changing the steering wheel angle relative to the driver. Such devices also facilitate entering and exiting from the vehicle, as do arrangements which permit lateral swinging of the steering wheel.

Common to most of the various known adjustment arrangements is that they have a locking means actuated by a manual knob or lever of friction type, the locking effect of which is dependent on how hard the driver turns the knob or pulls the lever. Since it is difficult to see to it that the lever or knob is always tightened with the same force, the locking force will in practice vary and deviations from ideal tightening, which produces a locking force which is suitably balanced for both normal loads and crash loads, are difficult to avoid.

SUMMARY AND OBJECTS

One purpose of the present invention is to provide an adjustable steering wheel arrangement, in which the locking force is constant, so that one has full control of the locking characteristics and can achieve a suitable balance for normal loads and crash loads, which is always automatically maintained.

This is achieved according to the invention in a steering wheel arrangement of the type described by way of introduction by virtue of the fact that the suspension means comprise a first supporting arm, which is mounted in the vehicle for pivotal movement about a second shaft and in which supporting arm the bearing device is mounted for pivotal movement about said first shaft, and that friction plates alternatingly joined to the supporting arm and to a fixed portion of the vehicle form a second plate package, which, by clamping means, can be compressed to lock the supporting arm relative to the vehicle.

By using thin friction plates it is possible to adapt the material and the size of the frictional surface to the requirements in order to achieve the desired lock in force, using a spring device, the spring force of which can be overcome without power assistance. For example, a simple foot pedal or wire arrangement in combination with a lever device can be sufficient to suspend the locking force.

In a further development of the invention for the purpose of achieving a particularly ergonomically advantageous adjustment range and a simple and secure installation in combination with a simple and secure locking mechanism, the suspension device comprises a first supporting arm pivotally mounted in the vehicle and that thin friction plates alternatingly joined to the supporting arm and to a fixed portion of the vehicle form a second plate package which, by clamping means, can be compressed to lock the supporting arm relative to the vehicle with the aid of spring clamping means coordinated with the first plate package in connection with the bearing device being locked relative to the supporting arm.

BRIEF DESCRIPTION OF THE DRAWINGS

The invention will be described in more detail below with reference to examples shown in the accompanying drawings, where.

DETAILED DESCRIPTION OF THE PREFERRED EMBODIMENT

Figure 3:
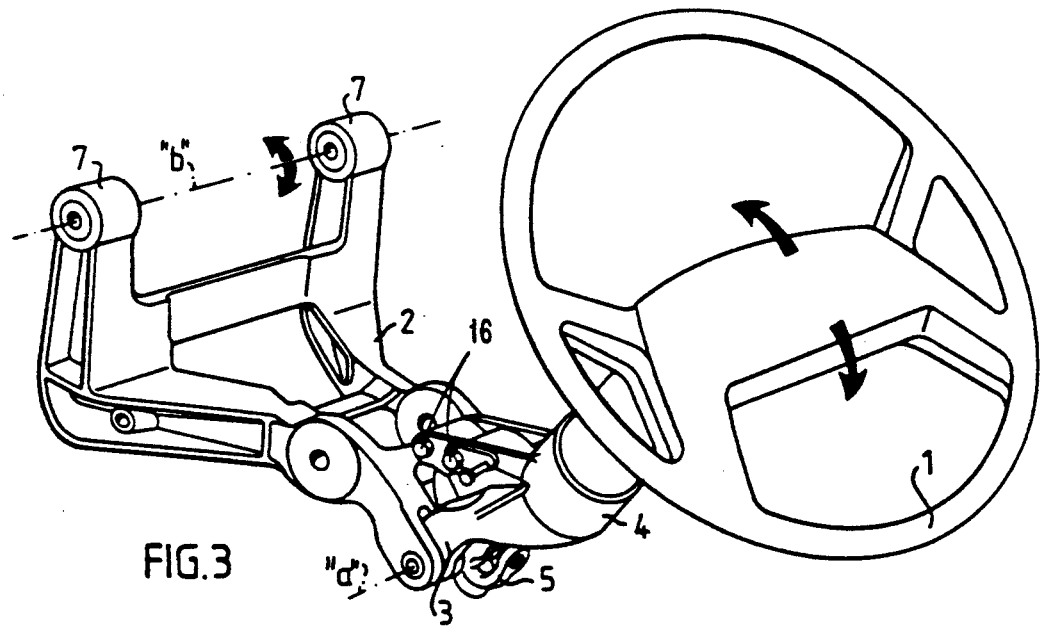
FIGS. 3 and 4 are perspective views of the arrangement in FIGS. 1 and 2 with certain parts removed.
Figure 4:
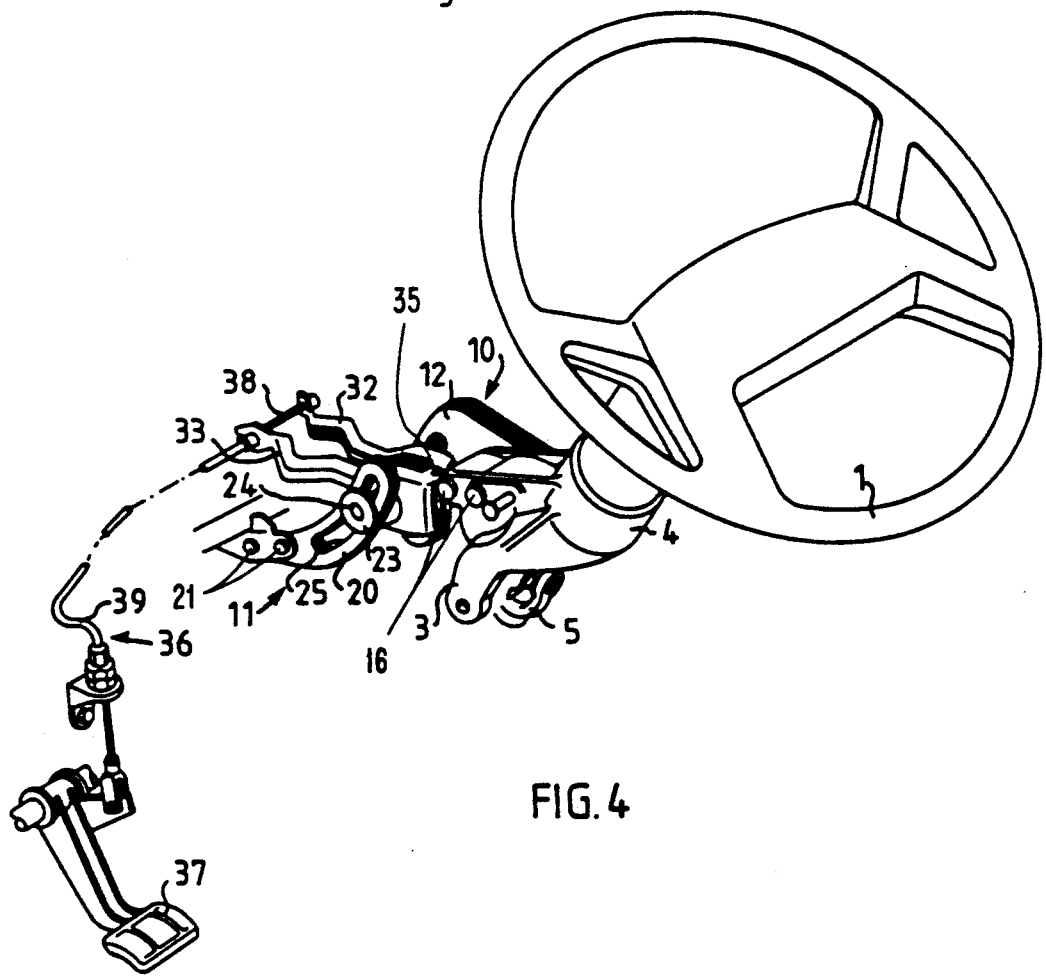

The steering wheel arrangement according to the invention has two main components which determine the movement geometry when resetting the steering wheel 1, namely a lower supporting arm 2 and an upper supporting arm 3 (see especially FIG. 3). The supporting arm 3 is integrated with a steering column 4 containing bearings for a steering shaft (not shown) joined to the steering wheel 1. In FIG. 3, the numeral 5 designates a universal joint securely joined to the steering shaft. The upper supporting arm 3 is pivoted in the lower supporting arm 2 in a bearing 6, which has a horizontal pivot axis "a" which passes through or in the immediate vicinity of the knuckle cross centre of the universal joint 5. The lower supporting arm 2 is pivotally journalled via bearings 7 in a bracket 8 solidly joined to the vehicle for pivot movement about a horizontal pivot axis "b". The bracket 8 can be mounted directly in a pedal plate or a supporting portion of the vehicle cab, e.g. a windshield beam.

The arrangement shown makes possible the pattern of movement shown with the arrows in FIG. 3. The supporting arms 2 and 3 can be swung in the same or different directions from an intermediate "normal position". When being swung in the same direction, e.g. counterclockwise, the steering wheel is moved upwards and forwards and thereby leaves a larger free space for getting in and out of the vehicle. When swinging in different directions, it is possible to readjust the steering wheel, i.e. a parallel displacement of the steering wheel without changing the angle, a movement essentially corresponding to that obtained with a telescoping arrangement.

The arrangement according to the invention has a first package 10 of thin plates for locking the supporting arms 2 and 3 relative to each other and a second package 11 of thin plates for locking the lower supporting arm relative to the bracket 8. The plate package 10 consists of a set of oblong friction plates 12 which are solidly joined to the upper supporting arm 3 and a set of intermediate circular friction washers 13 which have a central hole 14, through which there extends a shaft 15 securely screwed to the lower supporting arm 2. There is a small play between the hole 14 and the shaft 15 so that the washer 13 are easily displaceable axially on the shaft 15. The thin friction plates 12 are securely screwed to the upper supporting arm with the aid of two screws 16 and intermediate spacer washers 17 and are provided with a circle-arcuate curved oblong opening 18, the centre of curvature of which coincides with the pivot axis "a". The width of the opening 18 is adapted to the diameter of the shaft 15, which extends through all of the plates 12, 13.

The second package 11 of thin plates is, in a corresponding manner, made up of a set of oblong plates 20 screwed with screws 21 securely at one end to the bracket 8 with intermediate spacer washers 22 and a set of intermediate circular friction washers 23 with a central hole 24, through which the shaft 15 extends. The shaft 15 extends also through an arcuate oblong opening 25, the centre of curvature of which coincides with the pivot axis "b".

Between the packages of thin plates 10, 11, there is a spring device 30 in the form of a plurality of spring washers 31 slipped onto the shaft 15 and thus forming a spring package. Between the outer spring washer and the respective plate package 10 or 11 there is a lever 32 or 33, respectively, and a pressure washer 34, through which the shaft 15 extends.

The levers 32 and 33 are pivotally joined to each other by means of a pivot pin 35. A control cable 36 from an actuating pedal 37 has its wire 38 joined to the opposite end of one of the levers 32 and its casing 39 abutting against the opposite end of the other lever 33. When the pedal 37 is depressed, the levers 32 and 33 are moved towards each other and thus compress the spring package 30.

In the unloaded state, i.e. when the pedal is not depressed, the spring package 30 presses against the two pressure washers 34 which simultaneously compress the plate packages 10, 11 between themselves and the abutments 40 on the lower supporting arm 2. The steering wheel is thus fixed in its set position. When the pedal 37 is depressed, thus moving the levers towards each other via the cable 36, the clamping force is suspended on the plate packages 10, 11, and the supporting arms 2, 3 can be swung in the suitable direction to set the steering wheel in the desired position. As soon as the pedal is released, the supporting arms will be locked as the plate packages are again compressed.

In a modified embodiment (not shown here) there is used, instead of the "pliers" shown here, a single lever which is spring loaded and actuates a pair of pressure pistons corresponding to the pressure washers 34, in such a way that the pressure pistons compress the plate packages by the action of the lever and the spring means acting thereon. By using one spring loaded lever, it is possible to multiply the spring force up to 20 times, making it possible to use a relatively weak spring ($F=L70W$), and this in turn results in low pedal forces. If one also allows the lever to pivot about a pin on the shaft 15 and if one loads one of the pressure pistons by means of a spring washer, the locking function can be divided in two steps. When the pedal is depressed halfway, the pressure piston which is not loaded by a spring washer is released first. As the pedal is depressed to the bottom, the other pressure piston is also released, so that both angular and vertical adjustment can be made.

Figure 1:
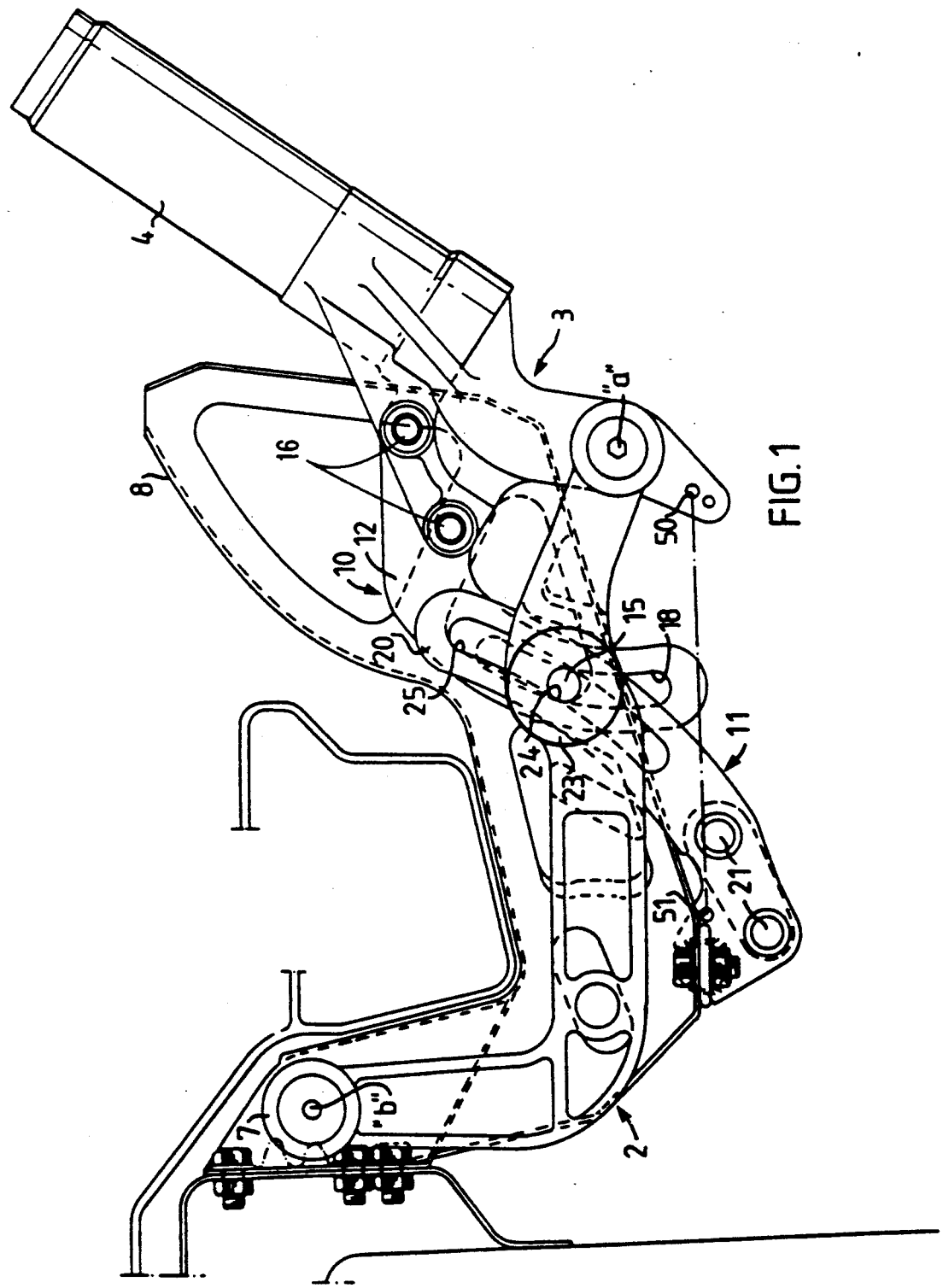
FIG. 1 shows a side view of one embodiment of the steering wheel arrangement according to the invention.
Figure 2:
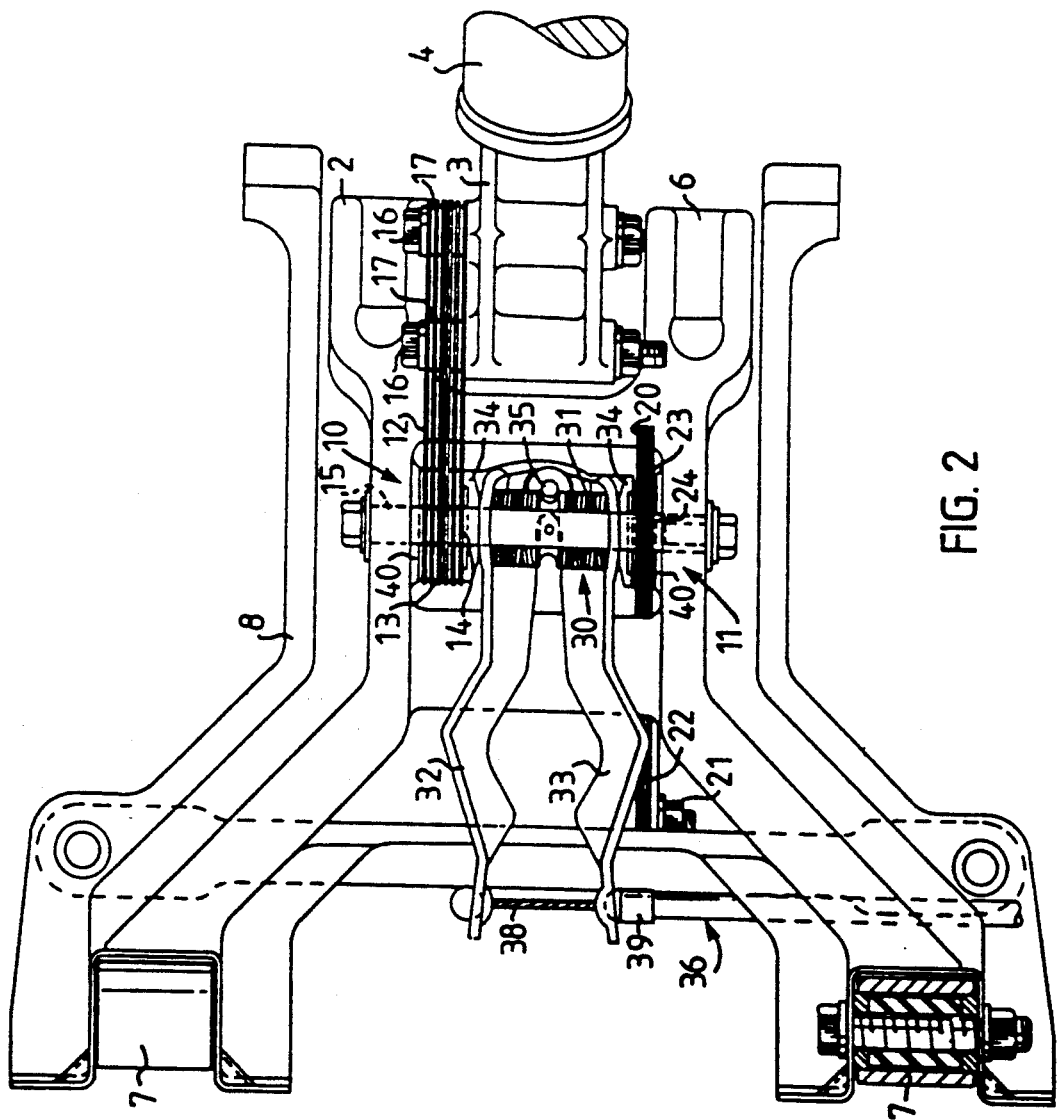
FIG. 2 is a view from above of the arrangement in FIG. 1.

By using other spring means, e.g. a gas spring (not shown), between the points 50 and 51 (FIG. 1) on the upper supporting arm 3 and the bracket 8, respectively, it is possible to achieve an automatic swinging of the steering wheel to a forward/raised position to facilitate getting in and out of the vehicle. Such an arrangement is particularly suited to truck cabs.

As an alternative to the pedal and wire arrangement 36, 37 for suspending the clamping force on the plate packages 10, 11, pneumatic or hydraulic means can be used which can be electrically controlled. They can be actuated by a switch on the instrument panel, the steering column or on the steering wheel.

In the embodiment shown and described here, the locking functions of the two plate packages are suspended simultaneously. It is, however, conceivable to have a control arrangement which gives priority to one of the functions, so that a certain depression of the foot pedal releases the lock between the supporting arms and only an additional depression of the pedal suspends the lock between the lower supporting arm and the cab.

We claim:

1. Steering wheel arrangement for motor vehicles comprising a steering column, suspension means for movably suspending the steering column in the vehicle and locking means, by means of which the steering column is lockable in various positions relative to the suspension means, wherein the steering column is joined to the suspension means for pivot movement about a first shaft, and that the locking means comprise, firstly, a first plate package of thin friction plates alternatingly joined to the steering column and the suspension means, secondly, spring clamping means arranged to press together, with constant spring force, the thin friction plates in the first plate package to lock the steering column and, thirdly, manually actuated means to remove a clamping effect of the spring clamping means and release the steering column for resetting relative to the suspension means, wherein the suspension means comprise a first supporting arm, which is mounted in the vehicle for pivotal movement about a second shaft and to which supporting arm the steering column is mounted for pivotal movement about said first shaft, and that friction plates are alternatingly joined to the supporting arm and to a fixed portion of the vehicle to form a second plate package, which by clamping means, can be compressed to lock the supporting arm relative to the vehicle.

2. Steering wheel arrangement according to claim 1, further comprising a common clamping device coordinated with the first and second plate packages.

3. Steering wheel arrangement according to claim 2, wherein the first plate package comprises thin plates displaceable in the axial direction on a common shaft, spring means arranged on the shaft between the plate packages act in opposite directions to clamp between themselves and cooperating in abutments the plates in the respective packages, and that a manually actuated device acts between opposite ends of the spring means to counteract the spring force and remove the clamping force.

4. Steering wheel arrangement according to claim 3, further comprising a second supporting arm and the common shaft carrying the plates is solidly joined to the first supporting arm pivotable about the second shaft, the steering column is mounted on the second supporting arm, which is pivotable about the first shaft at one end of the first supporting arm, and that the steering column has a universal joint, the pivot centre of which lies in the vicinity of the horizontal pivot axis of the second supporting arm.

5. Steering wheel arrangement according to claim 3 or 4, further comprising a pair of levers, wherein the spring means are arranged between the pair of levers pivotally joined to each other at one end, and that force actuated means are provided, by means of which the opposite ends of the levers can be moved towards each other to compress the spring means.

6. Steering wheel arrangement according to one of claims 3-4, wherein the spring means are a package of spring washers.

7. Steering wheel arrangement according to one of claims 3-4, wherein each package of plates has a first set of plates in the form of friction washers with circular holes adapted to a diameter of the common shaft carrying the plates, and a second set of plates in the form of oblong, plate elements with elongated circle-arcuate curved holes, the width of which corresponds to the diameter of the shaft carrying the plates and the centre curvature of which lies on the associated pivot axis.

8. Steering wheel arrangement according to one of claims 1-4, further comprising spring means, tensioned between anchor points on the steering column and a fixed portion of the vehicle, load the steering column in one pivot direction in order to swing the steering column to one end position when the clamping effect of the clamping means is removed.

* * * * *